United States Patent
Minford (10) Patent No.: US 7,581,765 B2
(45) Date of Patent: Sep. 1, 2009

(54) SEAL ASSEMBLY FOR MATERIALS WITH DIFFERENT COEFFICIENTS OF THERMAL EXPANSION

(75) Inventor: Eric Minford, Laurys Station, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 444 days.

(21) Appl. No.: 11/281,663

(22) Filed: Nov. 17, 2005

(65) Prior Publication Data

US 2008/0136179 A1 Jun. 12, 2008

(51) Int. Cl.
*F16L 23/00* (2006.01)
(52) U.S. Cl. .................. 285/364; 285/905; 285/354
(58) Field of Classification Search ............. 285/905, 285/381.5, 381.3, 354, 368, 364
See application file for complete search history.

(56) References Cited

U.S. PATENT DOCUMENTS

| | | | | |
|---|---|---|---|---|
| 1,383,008 | A * | 6/1921 | Myers | 285/354 |
| 2,201,684 | A * | 5/1940 | Kingsbury | 285/368 |
| 2,282,354 | A * | 5/1942 | Gunn | 285/905 |
| RE23,137 | E * | 7/1949 | Hobbs | 285/368 |
| 2,669,465 | A * | 2/1954 | Newell | 285/354 |
| 3,311,392 | A * | 3/1967 | Buschow | 285/363 |
| 3,746,374 | A * | 7/1973 | Sedgwick et al. | 285/905 |
| 4,595,218 | A * | 6/1986 | Carr et al. | 285/354 |
| 5,340,161 | A * | 8/1994 | Bagnulo | 285/368 |
| 5,529,284 | A * | 6/1996 | Berger et al. | 285/917 |
| 6,286,556 | B1 * | 9/2001 | Kato | 285/354 |
| 6,302,402 | B1 | 10/2001 | Rynders et al. | |
| 6,547,286 | B1 | 4/2003 | White et al. | |
| 6,572,155 | B2 * | 6/2003 | Dehmer | 285/354 |

FOREIGN PATENT DOCUMENTS

WO WO 2004/063110 A2 7/2004

* cited by examiner

*Primary Examiner*—David E Bochna
(74) *Attorney, Agent, or Firm*—Keith D. Gourley (57) ABSTRACT

Seal assembly comprising (a) two or more seal elements, each element having having a coefficient of thermal expansion; and (b) a clamping element having a first segment, a second segment, and a connecting segment between and attached to the first and second segments, wherein the two or more seal elements are disposed between the first and second segments of the clamping element. The connecting segment has a central portion extending between the first segment of the clamping element and the second segment of the clamping element, and the connecting segment is made of a material having a coefficient of thermal expansion. The coefficient of thermal expansion of the material of the connecting segment is intermediate the largest and smallest of the coefficients of thermal expansion of the materials of the two or more seal elements.

12 Claims, 2 Drawing Sheets

SEAL ASSEMBLY FOR MATERIALS WITH DIFFERENT COEFFICIENTS OF THERMAL EXPANSION

STATEMENT REGARDING FEDERALLY SPONSORED RESEARCH OR DEVELOPMENT

This invention was made with government support under Contract Numbers DE-FC26-97FT96052 and DE-FC26-98FT40343 between Air Products and Chemicals, Inc. and the U.S. Department of Energy. The Government has certain rights to this invention.

BACKGROUND OF THE INVENTION

The reliable containment of high-temperature pressurized gases is an important factor in the design and operation of piping and reactor systems in many diverse industries. Temperature cycles occur in these systems during startup, shutdown, and process upset conditions, and such cycles also may occur during normal process operations. The piping and process equipment in these systems often are constructed of various materials, many of which have different coefficients of thermal expansion. Couplings and joints between components with different coefficients of thermal expansion are problematic, especially when subjected to large temperature cycles. In order to minimize gas leakage, careful design of these couplings and joints is required.

Certain high-temperature systems such as ceramic gas separation membrane systems, ceramic membrane reactor systems, and solid oxide fuel cells utilize ceramic components operating at high temperatures. Gas flow to and from these ceramic components typically is provided by metal alloy piping systems, thereby requiring ceramic-to-metal joints. Because ceramic materials and metals usually have different thermal expansion characteristics, proper sealing at these ceramic-to-metal joints presents significant challenges in the design and operation of these systems. The seals at these joints must be reliable at high operating temperatures and must tolerate thermal cycling in order to achieve stable performance over the anticipated operating life of the system. In addition, the performance of these seals should be verifiable at room temperature during apparatus construction, and the seals should be economical and easy to assemble.

There is a need in the art of high-temperature gas processing for improved seals in couplings and joints between materials with different coefficients of thermal expansion. This need is addressed by the embodiments of the invention as described below and defined by the claims that follow.

BRIEF SUMMARY OF THE INVENTION

An embodiment of the invention relates to a seal assembly comprising (a) two or more seal elements, each element having a first face, a second face generally parallel to the first face, and an axis orthogonal to the first and second faces, wherein the seal elements are stacked such that adjacent faces are parallel and the axes are parallel or coincident, and wherein each of the seal elements is made of a material having a coefficient of thermal expansion; and (b) a clamping element having a first segment, a second segment, and a connecting segment between and attached to the first and second segments, wherein the two or more seal elements are disposed between the first and second segments of the clamping element and the clamping element is adapted to exert axial clamping forces on the two or more seal elements, wherein the connecting segment has a central portion extending between a plane formed by the face of a seal element adjacent the first segment of the clamping element and a plane formed by the face of a seal element adjacent the second segment of the clamping element, and wherein the connecting segment is made of a material having a coefficient of thermal expansion. The coefficient of thermal expansion of the material of the connecting segment is intermediate the largest and smallest of the coefficients of thermal expansion of the materials of the two or more seal elements.

In this embodiment, the seal assembly may further comprise a compliant sealing member disposed at any interfacial zone between adjacent seal elements and between a segment of the clamping element and an adjacent seal element.

Another embodiment of the invention includes a seal assembly comprising (a) a first seal element having a first face, a second face generally parallel to the first face, and an axis orthogonal to the first and second faces, wherein the first seal element is made of a first material having a first coefficient of thermal expansion;

(b) a second seal element having a first face, a second face generally parallel to the first face, and an axis orthogonal to the first and second faces that is parallel with or coincident with the axis of the first seal element, wherein the first seal element is made of a first material having a first coefficient of thermal expansion, and wherein the first face of the second seal element is in forcible contact with the second face of the first seal element; and (c) a clamping element adapted to urge the first seal element axially toward the second seal element, wherein the clamping element has a first segment in forcible contact with the first face of the first seal element, a second segment in forcible contact with the second face of the second seal element, and a connecting segment between and attached to the first and second segments, wherein the connecting segment has a central portion extending between planes formed by the first face of the first seal element and the second face of the second seal element, is generally parallel to the axes of the first and second seal elements, and is made of a third material having a third coefficient of thermal expansion;

wherein the third coefficient of thermal expansion is intermediate the first and second coefficients of thermal expansion.

In this embodiment, either of the first segment of the clamping element and the second segment of the clamping element may be permanently attached to the connecting segment of the clamping element. Alternatively, either of the first segment of the clamping element and the second segment of the clamping element may be removably attached to the connecting segment of the clamping element.

The first material may be selected from the group consisting of Haynes 230, Haynes 188, Haynes 214, Incoloy 800H, Inconel 600, Inconel 625, Inconel 693, and 400-Series Stainless Steels. The second material may be selected from the group consisting of aluminum oxide, zirconium oxide, cerium oxide, magnesium oxide, silicon carbide, silicon nitride, mixed metal perovskites, $(La_xSr_{1-x})_yCoO_{3-z}$ (wherein $1.0<x<0.4, 1.02 \geqq y >1.0$, and z is a number which renders the composition of matter charge neutral), and $(La_xCa_{1-x})_yFeO_{3-z}$ (wherein $1.0>x>0.5, 1.1\geqq y>1.0$, and z is a number which renders the composition of matter charge neutral). The third material may be selected from the group consisting of Haynes 230, Haynes 188, Haynes 214, Incoloy 800H, Inconel 600, Inconel 625, Inconel 693, and 400-Series Stainless Steels.

The second seal element may consist of a first subcomponent and a second subcomponent, each subcomponent having first face, a second face generally parallel to the first face, and an axis orthogonal to the first and second faces that is parallel with or coincident with the axis of the first seal element, wherein the first face of the first subcomponent is the first face of the second seal element, wherein the second face of the second subcomponent is the second face of the second seal element that is in forcible contact with the second segment of the clamping element. Either of the first segment of the clamping element and the second segment of the clamping element may be removably attached to the connecting segment of the clamping element.

In this embodiment, the seal assembly may further comprise a compliant sealing member disposed between the second segment of the clamping element and the second face of the second seal element. Alternatively or additionally, the seal assembly may further comprise a compliant sealing member disposed between the first segment of the clamping element and the first face of the first seal element.

In the seal assembly of this embodiment,
(1) the second seal element may be a flange attached to a first cylindrical pipe having an outer diameter, wherein the flange has an outer diameter;
(2) the clamping element may comprise a torroidal body having a first ring that forms the first segment of the clamping element and has an inner and an outer diameter, a second ring that forms the connecting segment of the clamping element and has an inner and an outer diameter, and a third ring that forms the second segment of the clamping element and has an inner and an outer diameter;
(3) the first seal element may be a compensating spacer ring having an inner and an outer diameter;
(4) the inner diameter of the first ring that forms the first segment of the clamping element may be greater than the outer diameter of the first cylindrical pipe;
(5) the inner diameter of the compensating spacer ring may be greater than the outer diameter of the first cylindrical pipe and the outer diameter of the compensating spacer ring may be less than the inner diameter of the second ring that forms the connecting segment of the clamping element; and
(6) the outer diameter of the flange may be less than the inner diameter of the second ring that forms the connecting segment of the clamping element.

The flange and first cylindrical pipe may be made of ceramic material, the clamping element may be a metallic material, and the compensating spacer ring may be a metallic material. The first material mat be selected from the group consisting of Haynes 230, Haynes 188, Haynes 214, Incoloy 800H, Inconel 600, Inconel 625, Inconel 693, and 400-Series Stainless Steels. The second material may be selected from the group consisting of aluminum oxide, zirconium oxide, cerium oxide, magnesium oxide, silicon carbide, silicon nitride, mixed metal perovskites, $(La_xSr_{1-x})_yCoO_{3-z}$ (wherein $1.0<x<0.4$, $1.02\geq y>1.0$, and z is a number which renders the composition of matter charge neutral), and $(La_xCa_{1-x})_yFeO_{3-z}$ (wherein $1.0>x>0.5$, $1.1\geq y>1.0$, and z is a number which renders the composition of matter charge neutral). The third material may be selected from the group consisting of Haynes 230, Haynes 188, Haynes 214, Incoloy 800H, Inconel 600, Inconel 625, Inconel 693, and 400-Series Stainless Steels.

An alternative embodiment of the invention relates to a seal assembly comprising
(a) a first seal element having a first face, a second face generally parallel to the first face, and an axis orthogonal to the first and second faces, wherein the first seal element has a first reference dimension defined by the axial distance between the first and second faces at a reference temperature, and wherein the first seal element is made of a first material having a first coefficient of thermal expansion;
(b) a second seal element having a first face, a second face generally parallel to the first face, and an axis orthogonal to the first and second faces that is parallel with or coincident with the axis of the first seal element, wherein the second seal element has a second reference dimension defined by the axial distance between the first and second faces at the reference temperature, wherein the first seal element is made of a first material having a first coefficient of thermal expansion, and wherein the first face of the second seal element is in contact with the second face of the first seal element; and
(c) a clamping element adapted to urge the first seal element axially toward the second seal element, wherein the clamping element has a first segment in forcible contact with the first face of the first seal element, a second segment in forcible contact with the second face of the second seal element, and a connecting segment between and attached to the first and second segments, wherein the connecting segment has a central portion extending between planes formed by the first face of the first seal element and the second face of the second seal element and is generally parallel to the axes of the first and second seal elements, and wherein the central portion is made of a third material having a third coefficient of thermal expansion;

wherein the first material, the reference thickness of the first seal element, the second material, the reference thickness of the second seal element, and the third material have values such that, at any selected temperature, $$|A_T-(B_T+C_T)|\leq 0.002 \text{ inch}$$

where $$A_T=A_R(\alpha_A)(T-T_R),$$

$$B_T=B_R(\alpha_B)(T-T_R), \text{ and}$$

$$C_T=C_R(\alpha_C)(T-T_R),$$

and where T is the selected temperature, $T_R$ is the reference temperature, $A_R$ is the first reference dimension, $B_R$ is the second reference dimension, $A_R$ is the sum of $B_R$ and $C_R$, $\alpha_A$ is the coefficient of thermal expansion of the a first material, $\alpha_B$ is the coefficient of thermal expansion of the second material, and $\alpha_C$ is the coefficient of thermal expansion of the third material.

Another alternative embodiment includeds a ceramic-to-metal seal assembly comprising
(a) a torroidal compensating spacer ring having a first face, a second face generally parallel to the first face, an inner diameter, an outer diameter, and an axis orthogonal to the first and second faces, wherein torroidal compensating spacer ring is made of a first metal having a first coefficient of thermal expansion;
(b) a cylindrical ceramic tube having an inner diameter, an outer diameter, and a ceramic flange formed at an end of the cylindrical ceramic tube, the ceramic flange having an outer diameter, wherein
(1) the inner diameter of the torroidal compensating spacer ring is greater than the outer diameter of the cylindrical ceramic tube and is disposed around the ceramic tube, (2) the ceramic flange forms a second seal element having a first face, a second face generally parallel to the first face, and an axis orthogonal to the first and second faces that is parallel with or coincident with the axis of the torroidal compensating spacer ring, (3) the first face of the second seal element is in forcible contact with the second face of the torroidal compensating spacer ring, and (4) the ceramic flange is made of a ceramic material having a second coefficient of thermal expansion; and (c) a torroidal clamping element adapted to urge the torroidal compensating spacer ring axially toward the second seal element, wherein the clamping element has a first segment in forcible contact with the first face of the torroidal compensating spacer ring, a second segment in forcible contact with the second face of the second seal element, and a connecting segment between and attached to the first and second segments, wherein the connecting segment (1) has a central portion extending between planes formed by the first face of the torroidal compensating spacer ring and the second face of the second seal element, (2) is generally parallel to the axes of the torroidal compensating spacer ring and the second seal element, and (3) is made of a second metal having a third coefficient of thermal expansion;

wherein the third coefficient of thermal expansion is intermediate the first and second coefficients of thermal expansion.

In this alternative embodiment, the first metal may be selected from the group consisting of Haynes 230, Haynes 188, Haynes 214, Incoloy 800H, Inconel 600, Inconel 625, Inconel 693, and 400-Series Stainless Steels. The second metal may be selected from the group consisting of Haynes 230, Haynes 188, Haynes 214, Incoloy 800H, Inconel 600, Inconel 625, Inconel 693, and 400-Series Stainless Steels. The ceramic flange may be made of a material selected from the group consisting of aluminum oxide, zirconium oxide, cerium oxide, magnesium oxide, silicon carbide, silicon nitride, mixed metal perovskites, $(La_xSr_{1-x})_yCoO_{3-z}$ (wherein $1.0<x<0.4$, $1.02 \geq y > 1.0$, and z is a number which renders the composition of matter charge neutral), and $(La_xCa_{1-x})_yFeO_{3-z}$ (wherein $1.0>x>0.5$, $1.1 \geq y \geq 1.0$, and z is a number which renders the composition of matter charge neutral). The ceramic tube may be made of the same material as the ceramic flange, wherein the ceramic tube and the ceramic flange form an integrated flanged ceramic tube.

A related embodiment of the invention includes a seal assembly comprising (a) a seal element having a first face, a second face generally parallel to the first face, and an axis orthogonal to the first and second faces, wherein the first seal element is made of a first material having a first coefficient of thermal expansion;

(b) a compliant sealing member adjacent the second face of the seal element;

(c) a clamping element having a first segment with a face in forcible contact with the first face of the seal element, a second segment having a face in forcible contact with the compliant seal member, and a connecting segment between and attached to the first and second segments, wherein the connecting segment has a central portion extending between planes formed by the face of the first segment and the face of the second segment, is generally parallel to the axis of the seal element, and is made of a second material having a second coefficient of thermal expansion, and wherein the a clamping element is adapted to urge the seal element axially toward the face of the second segment of the clamping element to compress the compliant seal member;

wherein the first coefficient of thermal expansion is greater than the second coefficient of thermal expansion.

Another related embodiment of the invention includes a method of making and operating a seal assembly comprising (a) providing at a temperature equal to a reference temperature a seal assembly comprising (1) a first seal element having a first face, a second face generally parallel to the first face, and an axis orthogonal to the first and second faces, wherein the first seal element is made of a first material having a first coefficient of thermal expansion;

(2) a second seal element having a first face, a second face generally parallel to the first face, and an axis orthogonal to the first and second faces that is parallel with or coincident with the axis of the first seal element, wherein the second seal element is made of a second material having a second coefficient of thermal expansion, and wherein the first face of the second seal element is in forcible contact with the second face of the first seal element; and (3) a clamping element adapted to urge the first seal element axially toward the second seal element, wherein the clamping element has a first segment in forcible contact with the first face of the first seal element, a second segment in forcible contact with the second face of the second seal element, and a connecting segment between and attached to the first and second segments, wherein the connecting segment has a central portion extending between planes formed by the first face of the first seal element and the second face of the second seal element, is generally parallel to the axes of the first and second seal elements, and is made of a third material having a third coefficient of thermal expansion;

(b) changing the temperature of the seal assembly to a selected temperature different than the reference temperature; and (c) maintaining the seal assembly at the selected temperature such that $$|A_T-(B_T+C_T)| \leq 0.002 \text{ inch}$$

where $A_T$, $B_T$, and $C_T$ are temperature-compensated dimensions defined by the equations $$A_T=A_R(\alpha_A)(T-T_R),$$

$$B_T=B_R(\alpha_B)(T-T_R), \text{ and}$$

$$C_T=C_R(\alpha_C)(T-T_R),$$

and where T is the selected temperature; $T_R$ is the reference temperature; $B_R$ is the axial distance between the faces of the first seal element at the reference temperature; $C_R$ is the axial distance between the faces of the second seal element at the reference temperature; $\alpha_A$ is the coefficient of thermal expansion of the first material; $\alpha_B$ is the coefficient of thermal expansion of the second material; $\alpha_C$ is the coefficient of thermal expansion of the third material; and $A_R=B_R+C_R$.

An alternative related embodiment includes a method of making and operating a seal assembly comprising (a) providing at a temperature equal to a reference temperature a seal assembly comprising (1) a seal element having a first face, a second face generally parallel to the first face, and an axis orthogonal to the first and second faces, wherein the first seal element is made of a first material having a first coefficient of thermal expansion;

(2) a compliant sealing member adjacent the second face of the seal element;

(3) a clamping element having a first segment with a face in forcible contact with the first face of the seal element, a second segment having a face in forcible contact with the compliant seal member, and a connecting segment between and attached to the first and second segments, wherein the connecting segment has a central portion extending between planes formed by the face of the first segment and the face of the second segment, is generally parallel to the axis of the seal element, and is made of a second material having a second coefficient of thermal expansion, and wherein the a clamping element is adapted to urge the seal element axially toward the face of the second segment of the clamping element to compress the compliant seal member;

(b) changing the temperature of the seal assembly to a selected temperature different than the reference temperature; and (c) maintaining the seal assembly at the selected temperature such that $|A_T - C_T| \leq 0.002$ inch where $A_T$ and $C_T$ are temperature-compensated dimensions defined by the equations $A_T = A_R(\alpha_A)(T-T_R)$ $C_T = C_R(\alpha_c)(T-T_R)$ where T is the selected temperature; $T_R$ is the reference temperature; $\alpha_A$ is the coefficient of thermal expansion of the first material; $\alpha_C$ is the coefficient of thermal expansion of the second material; $C_R$ is the axial distance between the first face and the second face of the seal element at the reference temperature;

$C'_R$ is the axial distance between the second face of the seal element and the face of the second segment of the clamping element at the reference temperature; and $A_R = C_R + C'_R$.

BRIEF DESCRIPTION OF SEVERAL VIEWS OF THE DRAWINGS

The various embodiments of the invention are illustrated by the following Figures, which are not necessarily to scale.

DETAILED DESCRIPTION OF THE INVENTION

The embodiments of the invention are directed to seal assemblies for forming a seal between two pipes or vessels having different coefficients of thermal expansion. The seal assembly includes a clamping element provides axial clamping forces against sealing elements, some of which are parts of the two pipes or vessels being sealed. When the seal is designed, the axial dimensions of the clamping and seal elements at ambient conditions and the coefficients of thermal expansion of the materials of the clamping and seal elements are selected so that as the assembled seal element is heated the absolute difference between the length of the clamping element connecting segment and the sum of the axial dimensions of the seal elements is less than 0.002 inch.

One of the embodiments utilizes a seal assembly having a rigid clamping element that exerts a clamping force on a first seal element and a second seal element adjacent the first seal element. The first and second segments of the clamping element are in forcible contact with the first and second sealing elements, and the first seal element is in forcible contact with the second seal element. The clamping element has a connecting segment opposite the first and second seal elements, and the coefficient of thermal expansion of the connecting segment is intermediate the coefficients of thermal expansion of the first and second seal elements.

As illustrated below, the first seal element is a compensating spacer element, the second seal element may be a part of first vessel or piping system, and either of or both of the segments of the clamping element may be part of a second vessel or piping system that is sealably connected to the first vessel or piping system. Depending on the system configuration and the relative differential pressures across the seal element, a compliant seal or gasket may be placed at any of the interfacial zones between the first seal element and the first segment of the clamping element, the first seal element and the compensating spacer element, and the compensating spacer element and the second segment of the clamping element. Some embodiments specifically do not utilize a compliant seal or gasket at the interfacial zone between the compensating spacer element and the second segment of the clamping element, and the compensating spacer element is in direct contact with the second segment of the clamping element.

Certain design parameters may be selected to compensate for the differences in thermal expansion of the seal components as the seal assembly is heated. These parameters include the material of the first seal element, the material of the compensating spacer element, the material of the connecting segment of the clamping element, the initial dimension of the first seal element or compensating spacer element at ambient temperature, and the second seal element at ambient temperature. By appropriate choice of these parameters, the net differential expansion between (1) the connecting segment of the clamping element and (2) the combined first seal element and compensating spacer element during heating can be minimized or eliminated, thereby maintaining the initial clamping loads placed on the first seal element and compensating spacer element.

The seal assembly discussed above is illustrated generically in FIG. 1. Seal assembly 1 comprises a clamping element having first segment 3, connecting segment 5, and second segment 7; first seal element or compensating spacer element 9; and second seal element 11. First segment 3, connecting segment 5, and second segment 7 of the clamping element may be the same materials or may be different materials. First segment 3 may be removably attached to connecting segment 5 by a bolt or other fastening device (not shown) at interfacial zone 13. Alternatively, first segment 3 and connecting segment 5 may be a single piece of a common material. Alternatively or additionally, second segment 7 may be removably attached to connecting segment 5 by a bolt or other fastening device (not shown) at interfacial zone 15. Alternatively, second segment 7 and connecting segment 5 may be a single piece of a common material.

Figure 1:
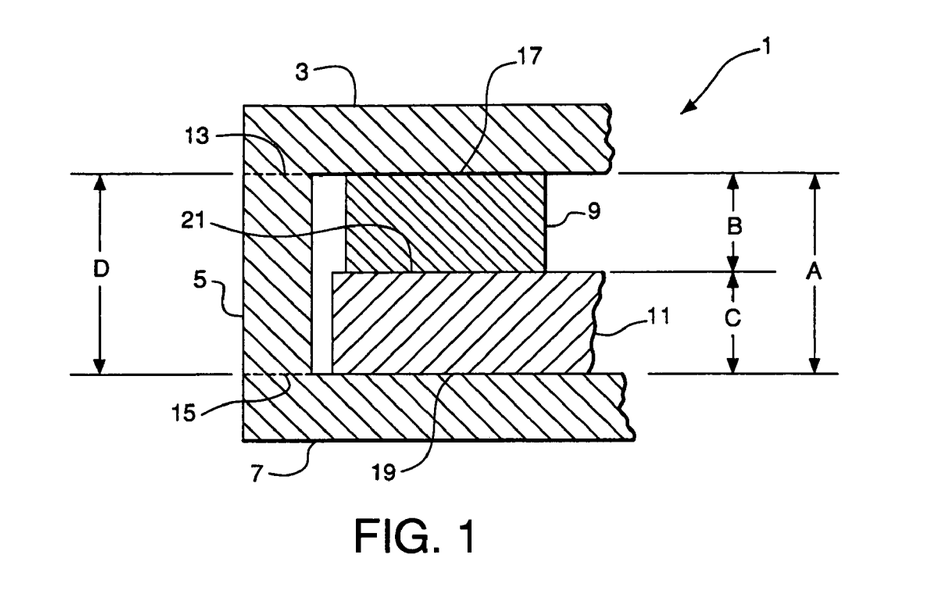
FIG. 1 is a schematic diagram illustrating a generic sealing assembly used in various embodiments of the present invention.

First seal element or compensating spacer element 9 typically is a separate piece as shown. Second seal element 11 may be a part of and connected to a first vessel or piping system, and either of or both of segments 3 and 7 of the clamping element may be part of a second vessel or piping system that is sealably connected to the first vessel or piping system.

The clamping element urges first segment 3 into forcible contact with compensating spacer element 9 at interfacial zone 17 and second segment 7 into forcible contact with second seal element 11 at interfacial zone 19. As a result, compensating spacer element 9 and second segment 7 are urged into forcible contact at interfacial zone 21. Compensating spacer element 9 is characterized by dimension B, which is the orthogonal or axial distance between the plane formed by the surface of the compensating spacer element at interfacial zone 17 and the plane formed by the surface of the compensating spacer element at interfacial zone 21. Second seal element 11 is characterized by dimension C, which is the orthogonal or axial distance between the plane formed by the surface of second seal element 11 at interfacial zone 21 and the plane formed by the surface of the second seal element at interfacial zone 19. The dimension A is defined as the sum of dimensions B and C. Dimension A is equivalent to the portion of connecting segment 5 that lies between the plane formed by the surface of compensating spacer element 9 at interfacial zone 17 and the plane formed by the surface of second seal element 11 at interfacial zone 19. Connecting segment 5 is characterized by dimension D, which lies between the plane formed by the surface of first segment 3 at interfacial zone 17 and the plane formed by the surface of second segment 7 at interfacial zone 19, i.e., D is the distance between the faces of the clamping element.

Interfacial zone 17 may be an interface formed by contact between flat surfaces on first segment 3 and compensating spacer element 9. Alternatively, interfacial zone 17 may include an intermediate member (not shown) such as a compliant sealing member as discussed later. Interfacial zone 19 may be an interface formed by contact between flat surfaces on second segment 7 and second seal element 11. Alternatively, interfacial zone 19 may include an intermediate member (not shown) such as a compliant sealing member as discussed later. Typically, interfacial zone 21 is an interface formed by direct contact between flat surfaces on compensating spacer element 9 and second seal element 11. Alternatively, interfacial zone 21 may include an intermediate member (not shown) such as a compliant sealing member as discussed later.

The term "forcible contact" as applied at the interfacial zone of two parts means that both parts on either side of the interfacial zone are urged together by axial compressive forces applied by the clamping element. For example, at interfacial zone 17, the forcible contact may be formed directly by actual contact between flat surfaces on first segment 3 and compensating spacer element 9. Alternatively, if interfacial zone 17 includes an intermediate seal member as discussed above, the forcible contact between first segment 3 and compensating spacer element 9 will occur via the intermediate member, i.e., the axial compressive force will be transmitted from first segment 3 to the intermediate member and from the intermediate member to compensating spacer element 9. In another example, at interfacial zone 19, the forcible contact may be formed directly by actual contact between flat surfaces on second segment 7 and second seal element 11. Alternatively, if interfacial zone 19 includes an intermediate member as discussed above, the forcible contact between second segment 7 and second seal element 11 will occur via the intermediate member. In yet another example, at interfacial zone 21, the forcible contact may be formed directly by actual contact between flat surfaces on compensating spacer element 9 and second seal element 11. Alternatively, if interfacial zone 21 includes an intermediate member as discussed above, the forcible contact between compensating spacer element 9 and second seal element 11 will occur via the intermediate member. Thus the term "forcible contact" at an interfacial zone includes either (1) actual contact between two surfaces or (2) contact of a first surface with a surface of an intermediate member and contact of a second surface with another surface of the intermediate member, wherein all surfaces and, if present, the surfaces of the intermediate member, are urged together by compressive axial forces applied by the clamping element.

The term "seal element" is defined as a rigid part of a seal assembly disposed within a clamping element. The seal element is not deformed by the application of axial clamping forces. The term "compliant sealing member" is defined as a deformable part of a seal assembly that is deformed by the application of axial clamping forces. Axial clamping forces are the forces exerted on a seal assembly that cause forcible contact between the seal elements and between seal elements and compliant sealing members in the direction of the axes of the seal members. Ceramic material is defined as an inorganic, non-metallic material. A metallic material is a pure metal, metal alloy, or mixture of metals, or a composite material containing a pure metal, metal alloy, or mixture of metals.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

First segment 3, connecting segment 5, and second segment 7 of the clamping element may be the same materials or may be different materials. Compensating spacer element 9 is made of a first material having a first coefficient of thermal expansion, second seal element 11 is made of a second material having a second coefficient of thermal expansion, and connecting segment 5 is made of a third material having a third coefficient of thermal expansion. The third coefficient of thermal expansion is intermediate the first and second coefficients of thermal expansion.

First seal element or compensating spacer element 9 has a reference thickness or dimension defined by a reference dimension $B_R$ at a reference temperature, second seal element 11 has a reference thickness or dimension defined by the dimension $C_R$ at the reference temperature, and dimension $A_R$ at the reference temperature is the sum of reference dimensions $B_R$ and $C_R$ at the reference temperature. The geometric definitions of reference dimensions $A_R$, $B_R$, and $C_R$ correspond to the geometric definitions of A, B, and C, respectively, as given above. The reference temperature may be any temperature, but advantageously the reference temperature is an ambient temperature between about 15 and 35° C. When the seal assembly is at the reference temperature, the clamping element applies an initial axial compressive force that presses compensating spacer element 9 and second seal element 11 together in forcible contact.

The reference dimensions of compensating spacer element 9 ($B_R$) and seal element 11 ($C_R$), and the materials of compensating spacer element 9, second seal element 11, and connecting segment 5, are initially selected when the seal assembly is designed. The proper selection of these parameters is made so that, at any selected temperature, a temperature-compensated dimension, $A_T$, differs from the sum of temperature-compensated dimensions $B_T$ and $C_T$ at the selected temperature by an absolute value of less than about 0.002 inch. Typically, this difference is within the compliance tolerance that can be achieved by commercially-available compliant sealing elements such as, for example, C-rings and O-rings.

The temperature-compensated dimensions $A_T$, $B_T$, and $C_T$ at any selected temperature are defined by the equations $$A_T = A_R(\alpha_A)(T-T_R) \quad (1)$$

$$B_T = B_R(\alpha_B)(T-T_R) \quad (2)$$

$$C_T = C_R(\alpha_C)(T-T_R) \quad (3)$$

where T is the selected temperature, $T_R$ is the reference temperature, $\alpha_A$ is the coefficient of thermal expansion of the material of connecting segment 5 of the clamping element, $\alpha_B$ is the coefficient of thermal expansion of the material of compensating spacer element 9, $\alpha_C$ is the coefficient of thermal expansion of the material of second seal element 11, and $A_R = B_R + C_R$.

The reference dimensions of compensating spacer element 9 ($B_R$) and seal element 11 ($C_R$), and the materials of compensating spacer element 9, second seal element 11, and connecting segment 5, are initially selected when the seal assembly is designed such that, at any selected temperature, dimensions of the seal assembly are described by the equation $$|A_T - (B_T + C_T)| \leq 0.002 \text{ inch} \quad (4)$$

The seal assembly components are assembled at the reference temperature (typically ambient temperature) and an initial axial loading is placed on compensating spacer element 9, second seal element 11, and compliant sealing member(s) or spring-type member(s), if used, by the clamping element. This initial clamping force may be provided, for example, by set screws or threaded studs and bolts for attaching segment 3 and/or second segment 7 to connecting segment 5. Other known methods of generating axial clamping or compression forces may be used. When the coefficients and initial dimensions of the seal components are properly selected as described above, the initial axial loading of the seal assembly will be sufficient after heating such that sealing is maintained by the components of the sealing assembly at elevated temperatures.

The working seal or seals of the seal assembly may be provided at any of interfacial zones 17, 19, and 21. A working seal is an element that provides the actual sealing contact between the two adjacent surfaces to minimize or eliminate gas leakage across the seal assembly. A working seal may be formed by an interface between carefully machined mating surfaces or at an interfacial zone by commercially-available compliant sealing elements such as, for example, C-rings and O-rings. The location of the working seal or seals will depend on the actual configuration of the seal assembly and the relative pressure differential across the seal assembly. The seal assembly may be attached to the piping or vessel systems that are sealably connected in any desired configuration as illustrated below. In FIG. 1, any of first segment 3, second segment 7, and second seal element 11 may be attached to the piping or vessel systems being sealably connected by the seal assembly. Typically, compensating spacer element 9 is independent of and not attached to the piping or vessel systems being sealably connected.

Figure 2:
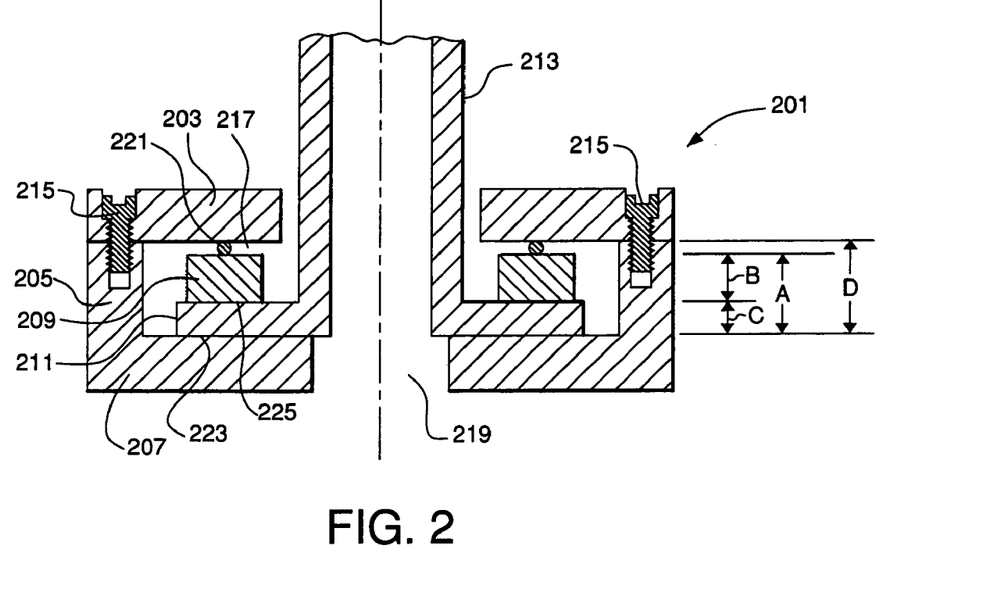
FIG. 2 a schematic diagram illustrating the use of the generic sealing assembly of FIG. 1 in an embodiment of the invention.

The generic seal assembly may be utilized in the embodiment illustrated in FIG. 2. Seal assembly 201 is a torroidal assembly comprising a clamping element having first clamp segment or ring 203, clamp connecting segment 205, and second clamp segment 207; first seal element or compensating spacer element 209; and intermediate seal element 211. In this embodiment, clamp connecting segment 205 and second clamp segment 207 comprise a single piece of material forming a second ring of the clamping element. Intermediate seal element 211 forms a flange portion of cylindrical pipe or vessel 213 and is made of the same material. Clamp connecting segment 205, first seal element or compensating spacer element 209, and intermediate seal element 211 are made of different materials.

First clamp segment or ring 203 is removably attached to clamp connecting segment 205 by set screws 215. The set screws typically are made of the same material as clamp connecting segment 205, and ring 203 may be made of the same material as set screws 215 and clamp connecting segment 205. Alternatively, any other known type of fastening devices may be used. For example, threaded studs may be screwed into clamp connecting segment 205 and extend through stud holes in first clamp segment or ring 203, and bolts may be placed on the studs and tightened to connect first clamp segment or ring 203 to clamp connecting segment 205 and generate axial clamping forces on the seal assembly.

Hole 219 extends through second clamp segment 207 and may be utilized to connect a second pipe or vessel (not shown) via a threaded or welded connection so that seal element 201 provides an operating seal between the second pipe or vessel and pipe or vessel 213. Alternatively, second clamp segment 207 may have no hole and thus would serve as a cap to seal cylindrical pipe or vessel 213.

The clamping element urges first clamp segment or ring 203 into forcible contact with compliant seal member 221, thereby urging compliant seal member 221 into forcible sealing contact with compensating spacer element 209 at interfacial zone 217 and second clamp segment 207 into forcible sealing contact with intermediate seal element 211 at interfacial zone 223. Compliant seal member 221 may be, for example, a suitable commercially-available compliant gasket, O-ring, C-ring, or other sealing device. For example, Metal C-Rings or Metal O-Rings manufactured by Advanced Products Company, Inc., may be used in this service. Compensating spacer element 209 and intermediate seal element 211 are urged into forcible contact at interfacial zone 223 to place an axial load on compliant seal member 221.

Clamp connecting segment 205 is characterized by dimension D, which lies between the plane formed by the surface of first clamp segment or ring 203 at interfacial zone 217 and the plane formed by the surface of second clamp segment 207 at interfacial zone 223. Compensating spacer element 209 is characterized by dimension B, which is the orthogonal or axial distance between the plane formed by the surface of the compensating spacer element at interfacial zone 217 and the plane formed by the surface of the compensating spacer element at interfacial zone 225. Second seal element 211 is characterized by dimension C, which is the orthogonal or axial distance between the plane formed by the surface of second seal element 211 at interfacial zone 225 and the plane formed by the surface of the second seal element at interfacial zone 223.

Interfacial zone 217 includes compliant sealing member 221 to provide sealing force for seal assembly 201. Alternatively, interfacial zone 217 may be an interface formed by contact between flat surfaces on first segment 203 and compensating spacer element 209. Interfacial zone 223 may be an interface formed by contact between flat surfaces on second segment 207 and second seal element 211. Alternatively, interfacial zone 223 may contain an intermediate member (not shown) such as a compliant sealing member. Interfacial zone 225 is an interface formed by contact between flat surfaces on compensating spacer element 209 and second seal element 211.

As described above, dimension A is the sum of dimensions B and C. Dimension A is equivalent to the portion of connecting segment 205 that lies between the plane formed by the surface of compensating spacer element 209 at interfacial zone 217 and the plane formed by the surface of second seal element 211 at interfacial zone 223. Dimension D is the distance between the faces of the clamping element at interfaces 217 and 223. In this embodiment, dimension D differs from dimension A by the height of compliant sealing member 221.

Seal assembly 201 is designed by selecting the materials and reference dimensions of the components of the assembly. In particular, the reference dimensions of compensating spacer element 209 ($B_R$) and seal element 211 ($C_R$), and the materials of compensating spacer element 209, second seal element 211, and connecting segment 205, are properly selected. The coefficient of thermal expansion of connecting segment 205 is intermediate the coefficients of thermal expansion of compensating spacer element 209 and second seal element 211. The seal components are assembled at ambient conditions and an initial axial compressive force is applied by the clamping element. The completed seal assembly then is changed, for example by heating, to a selected temperature, T. As a result of the proper selection of the parameters defined above, the temperature-compensated dimension $A_T$ differs from the sum of the temperature-compensated dimensions $B_T$ and $C_T$ at the selected temperature by an absolute value of less than about 0.002 inch as defined in equation (4) above.

In an alternative embodiment of FIG. 2, a flat compliant seal gasket may be used at interface 223 instead of compliant sealing member 221. In addition, a spring-type compression ring (not shown) may be installed at interface 217 to maintain the axial load on the seal assembly and to compensate for the small differences in the seal element dimensions that may occur when the seal element is heated. A circular groove may be cut in the face of second seal element or flange 211 at interfacial zone 223 to contain this compression ring.

In another alternative embodiment of FIG. 2, compensating spacer element 209 is eliminated. Clamp connecting segment 205 is made of a first material. First clamp segment or ring 203, clamp connecting segment 205, and second clamp segment 207 all may be made of the same first material. Second seal element or flange 211 is made of a second material. In this alternative, the coefficient of thermal expansion of the first material of clamp connecting segment 205 is less than the coefficient of thermal expansion of the second material of second seal element or flange 211.

In this alternative embodiment, a dimension C' is defined as the distance at interface 223 between second clamp segment 207 and second seal element or flange 211. At a reference temperature and after the seal assembly is assembled and axial force is applied to compress compliant sealing member 221, the distance at interface 223 between second clamp segment 207 and second seal element or flange 211 is the reference distance $C'_R$. Another parameter, A', is defined as the sum of dimensions C and C'. In this alternative, the first material, the second material, the dimension C of second seal element or flange 211 at the reference temperature (i.e., $C_R$), and the dimension C' at the reference temperature (i.e., $C'_R$) are selected in the design of the seal element so that at any selected temperature $$|A_T - C_T| \leq 0.002 \text{ inch} \quad (5)$$

where the temperature-compensated dimensions $A_T$ and $C_T$ at any selected temperature are defined by the equations $$A_T = A_R(\alpha_A)(T - T_R) \quad (6)$$

$$C_T = C_R(\alpha_C)(T - T_R) \quad (7)$$

where T is the selected temperature; $T_R$ is the reference temperature; $\alpha_A$ is the coefficient of thermal expansion of the first material; $\alpha_C$ is the coefficient of thermal expansion of the second material; $\alpha_A < \alpha_C$; and $A_R = C_R + C'_R$.

While this alternative embodiment has fewer design parameters and is more limited in material selection than the previous embodiment of FIG. 2, there may be scenarios in which the design features of this alternative seal assembly are desirable.

Figure 3:
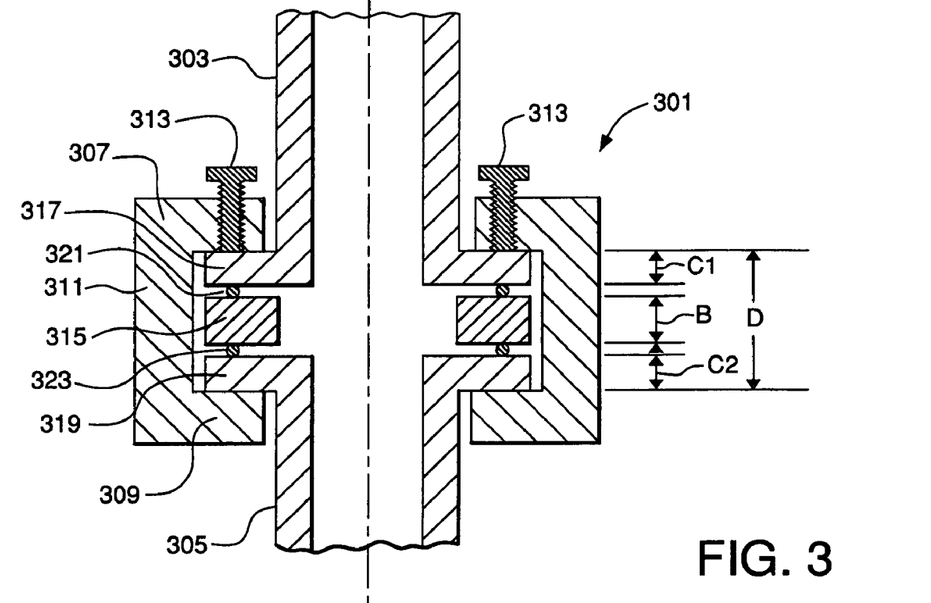
FIG. 3 a schematic diagram illustrating the use of the generic sealing assembly of FIG. 1 in another embodiment of the invention.

The generic seal assembly of FIG. 1 may be applied to an alternative embodiment illustrated in FIG. 3. In this embodiment, seal assembly 301 is formed between flanged cylindrical pipes or vessels 303 and 305. The seal assembly utilizes a torroidal clamp element comprising first clamp segment 307, second clamp segment 309 opposite first clamp segment 307, and connecting segment 311 between clamp segments 307 and 309. The clamping element may be fabricated as a split ring to enable installation around the flanges. Axial clamping force may be applied by bolts 313.

Compensating spacer ring 315 is disposed between flange 317 of pipe 303 and flange 319 of pipe 305. Compliant seal ring 321 is disposed between compensating spacer ring 315 and flange 317, and compliant seal ring 323 is disposed between compensating spacer ring 315 and flange 319. Flanges 371 and 319 are integral parts of flanged pipes or vessels 303 and 305, respectively. Grooves (not shown) may be cut into the faces of compensating spacer ring 315 to locate and contain the compliant seal rings. Alternatively or additionally, grooves (not shown) may be cut into the faces of flange 317 and/or flange 319 to locate and contain the compliant seal rings. The compliant sealing rings may be, for example, suitable commercially-available compliant gaskets, O-rings, C-rings, or other sealing devices. For example, Metal C-Rings or Metal O-Rings manufactured by Advanced Products Company, Inc., may be used in this service.

The thickness of flange 317 is characterized by the dimension C1, the thickness of flange 319 is characterized by the dimension C2, and the dimension of compensating spacer ring 315 is characterized by the dimension B. The distance between opposing faces of clamp element 307 and clamp element 309 is D. The sum of C1, C2, and B differs from D by the sum of the distances between compensating spacer ring 315 and flanges 317 and 317.

Flanged cylindrical pipe 303 (including flange 321), flanged cylindrical pipe 305 (including flange 323), and compensating spacer ring 315 are made of different materials. First clamp element 307, second clamp element 309, and connecting element 311 form a single piece (the clamping element) and are made of a common material. Bolts 313 typically are made of the same material as the parts of the clamping element.

In one embodiment, flanged cylindrical pipe 303, the components of the clamp element, and bolts 313 are made of a first material; compensating spacer ring 315 is made of a second material; and flanged cylindrical pipe 305 is made of a third material. In this embodiment, the first material, the second material, the third material, the dimension B of compensating spacer ring 315 at a reference temperature (i.e., $B_R$), and the dimension C2 of flange 319 at the reference temperature (i.e., $C2_R$), are selected in the design of the seal element so that at any selected temperature $$|A_T - (B_T + C2_T)| \leq 0.002 \text{ inch} \quad (8)$$

where the temperature-compensated dimensions $A_T$, $B_T$, and $C2_T$ at any selected temperature are defined by the equations $$A_T = A_R(\alpha_A)(T - T_R) \quad (9)$$

$$B_T = B_R(\alpha_B)(T - T_R) \quad (10)$$

$$C2_T = C2_R(\alpha_C)(T - T_R) \quad (11)$$

where T is the selected temperature; $T_R$ is the reference temperature; $\alpha_A$ is the coefficient of thermal expansion of the first material of flanged cylindrical pipe 305 (including flange 321) and the clamp element (including connecting element 311 and bolts 313); $\alpha_B$ is the coefficient of thermal expansion of the second material of compensating spacer ring 315; $\alpha_C$ is the coefficient of thermal expansion of the third material of flanged cylindrical pipe 305 (including flange 309); and $A_R = B_R + C2_R$. The coefficient of thermal expansion of the first material typically is intermediate the coefficients of thermal expansion of the second and third materials.

In another embodiment, flanged cylindrical pipe 303 (including flange 321) is made of a first material, the components of the clamp element (including connecting element 311 and bolts 313) are made of a second material; flanged cylindrical pipe 305 (including flange 323) is made of a third material; and compensating spacer ring 315 is made of a fourth material.

In this embodiment, the first material, the second material, the third material, the fourth material, the dimension B of compensating spacer ring 315 at a reference temperature (i.e., $B_R$), the dimension C1 of flange 317 at the reference temperature (i.e., $C1_R$), and the dimension C2 of flange 319 at the reference temperature (i.e., $C2_R$), are selected in the design of the seal element so that at any selected temperature $$|A_T - (B_T + C1_T + C2_T)| \leq 0.002 \text{ inch} \quad (12)$$

where the temperature-compensated dimensions $A_T$, $B_T$, and $C2_T$ at any selected temperature are defined by the equations $$A_T = A_R(\alpha_A)(T - T_R) \quad (13)$$

$$B_T = B_R(\alpha_B)(T - T_R) \quad (14)$$

$$C1_T = C1_R(\alpha_{C1})(T - T_R) \quad (15)$$

$$C2_T = C2_R(\alpha_{C2})(T - T_R) \quad (16)$$

where T is the selected temperature; $T_R$ is the reference temperature; $\alpha_A$ is the coefficient of thermal expansion of the first material of flanged cylindrical pipe 303, the components of the clamp element, and bolts 313; $\alpha_B$ is the coefficient of thermal expansion of the second material of compensating spacer ring 315; $\alpha_{C1}$ is the coefficient of thermal expansion of the third material of flanged cylindrical pipe 303; $\alpha_{C2}$ is the coefficient of thermal expansion of the fourth material of flanged cylindrical pipe 305; and $A_R = B_R + C1_R + C2_R$. The coefficient of thermal expansion of the first material (the clamp element including connecting element 311 and bolts 313) is intermediate the highest and lowest of the coefficients of thermal expansion of the second material (compensating spacer ring 315), the third material (flanged cylindrical pipe 303 including flange 321), and the fourth material (flanged cylindrical pipe 305 including flange 323).

While this embodiment with four different materials requires a more complicated design procedure than the previous embodiment with three different materials, the designs of the embodiments utilize the same generic principle described above with reference to FIGS. 1 and 2. In any of the alternatives in the embodiments of FIG. 3, the clamp element of FIG. 2 may be used instead of the clamp element shown in FIG. 3.

Figure 4:
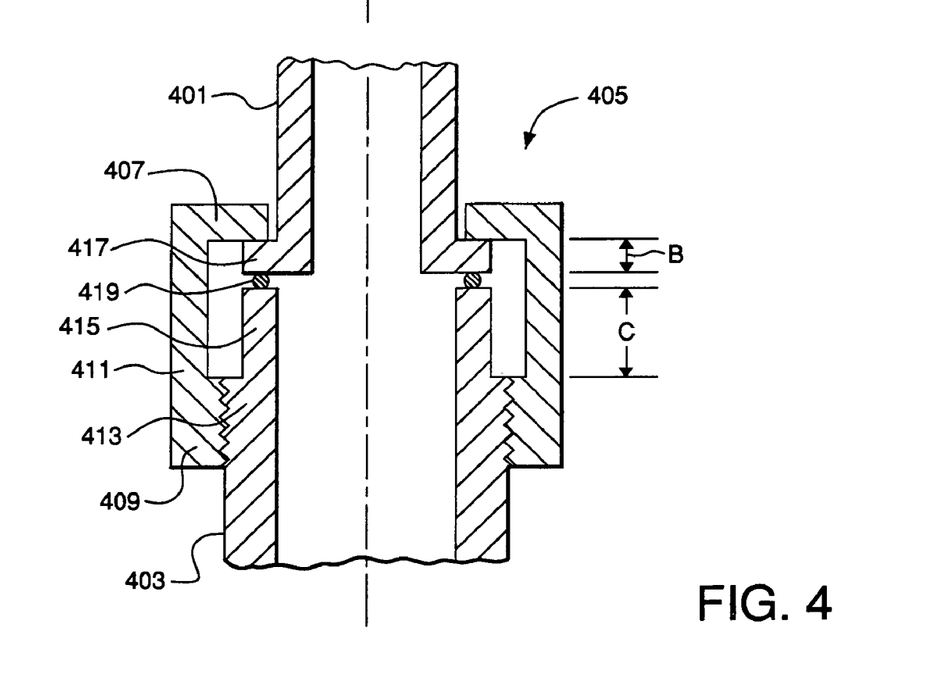
FIG. 4 a schematic diagram illustrating another embodiment of the invention.

Another embodiment is illustrated in FIG. 4 using an alternative method for applying axial force to the seal elements. In this embodiment, flanged pipe or vessel 401 is sealed to threaded pipe or vessel 403 by threaded clamp assembly 405. The threaded clamp assembly has a torroidal shape and comprises first clamp element 407, threaded clamp element 409, and connecting element 411 between first clamp element 407 and threaded clamp element 409. Threaded pipe or vessel 403 has threaded section 413 that engages the threads on threaded clamp element 409 and non-threaded extension 415 that extends beyond the threaded section.

The inner diameter of first clamp element 407 is greater than the outer diameter of the body section of flanged pipe or vessel 401 and the inner diameter of connecting element 411 is greater than the outer diameter of flange 417 of flanged pipe or vessel 401. The inner diameter of the threaded section of threaded clamp element 409 is also is greater than the outer diameter of flange 417 of flanged pipe or vessel 401.

The working seal is formed at interface 418 between the face of non-threaded extension 415 and the face of flange 417 and is provided by compliant seal ring 419. Grooves (not shown) may be cut into the face of non-threaded extension 415 and/or the face of flange to locate and contain the compliant seal ring. The compliant sealing ring may be, for example, a suitable commercially-available compliant gasket, O-ring, C-ring, or other sealing device. For example, Metal C-Rings or Metal O-Rings manufactured by Advanced Products Company, Inc., may be used in this service. Axial clamping force is applied to press the faces of non-threaded extension 415 and flange 417 together against compliant seal ring 419 by turning the threaded clamp assembly to engage and move the threads on threaded pipe or vessel 403 and threaded clamp element 409. The length of non-threaded extension 415 is characterized by dimension B and the thickness of flange 417 is characterized by the dimension C.

In this embodiment, threaded clamp assembly 405 (including connecting element 411) is made of a first material, non-threaded extension 415 is made of a second material, and flanged pipe or vessel 401 and flange 417 is made of a third material. The first material, the second material, the third material, the dimension C of flange 417 at a reference temperature (i.e., $C_R$), and the dimension B of non-threaded extension 415 at the reference temperature (i.e., $B_R$), are selected in the design of the seal element so that at any selected temperature $$|A_T - (B_T + C_T)| \leq 0.002 \text{ inch} \quad (17)$$

where the temperature-compensated dimensions $A_T$, $B_T$, and $C_T$ at any selected temperature are defined by the equations $$A_T = A_R(\alpha_A)(T - T_R) \quad (18)$$

$$B_T = B_R(\alpha_B)(T - T_R) \quad (19)$$

$$C_T = C_R(\alpha_C)(T - T_R) \quad (20)$$

where T is the selected temperature; $T_R$ is the reference temperature; $\alpha_A$ is the coefficient of thermal expansion of the first material $\alpha_B$ is the coefficient of thermal expansion of the second material of flange 417; and $A_R=B_R+C_R$. The coefficient of thermal expansion of the first material is intermediate the coefficients of thermal expansion of the second and third materials. The coefficient of thermal expansion of the first material may be less than the coefficient of thermal expansion of the second material.

In an alternative of this embodiment, threaded clamp assembly 405 (including connecting element 411) and non-threaded extension 415 are made of a first material, and flanged pipe or vessel 401 (including flange 417) is made of a second material. Pipe 403 including the threaded section may be the same material as threaded clamp assembly 405 (including connecting element 411); alternatively, pipe 403 including the threaded section may be a different material than threaded clamp assembly 405 (including connecting element 411). In this alternative, the first material, the second material, the dimension C of flange 417 at a reference temperature (i.e., $C_R$), and a dimension C' at a reference temperature (i.e., $C'_R$) are selected in the design of the seal element so that at any selected temperature $$|A_T - C_T| \geq 0.002 \text{ inch} \quad (21)$$

where the temperature-compensated dimensions $A_T$ and $C_T$ at any selected temperature are defined by the equations $$A_T = A_R(\alpha_A)(T - T_R) \quad (22)$$

$$C_T = C_R(\alpha_C)(T - T_R) \quad (23)$$

where T is the selected temperature; $T_R$ is the reference temperature; $\alpha_A$ is the coefficient of thermal expansion of the first material; $\alpha_C$ is the coefficient of thermal expansion of the second material; and $A_R = C_R + C'_R$.

The dimension C' is defined as the distance between the face of non-threaded extension 415 and the face of flange 417 at interface 418. When the seal assembly is assembled at the reference temperature, an initial axial load is placed on compliant seal ring 419 to slightly compress the ring. The distance between the face of non-threaded extension 415 and the face of flange 417 at interface 418 at the reference temperature then is the dimension $C'_R$. In this alternative, the coefficient of thermal expansion of the first material (threaded clamp assembly 405 including connecting element 411) is less than the coefficient of thermal expansion of the second material (flange 417).

In any the embodiments described above, components of the seal assembly may be metal and/or ceramic. In one embodiment, all components of the seal assembly may be metal, and the seal assembly may be used to seal two pipes or vessels made of different metals. Alternatively, the components of the seal assembly may be metal and ceramic, and the seal assembly may be used to seal a metal pipe or vessel to a ceramic pipe or vessel. In another alternative, the components of the seal assembly may be metal, and the seal assembly may be used to seal two ceramic pipes or vessels having different coefficients of thermal expansion. Exemplary metals that can be used for seal elements include Haynes 230, Haynes 188, Haynes 214, Incoloy 800H, Inconel 600, Inconel 625, Inconel 693, and 400-Series Stainless Steels. Exemplary ceramic materials that can be used for seal elements include, but are not limited to, aluminum oxide, zirconium oxide, cerium oxide, magnesium oxide, silicon carbide, silicon nitride, and mixed metal perovskites including $(La_xSr_{1-x})_yCoO_{3-z}$ (wherein 1.0<x<0.4, 1.02≧y>1.0, and z is a number which renders the composition of matter charge neutral) and $(La_xCa_{1-x})_yFeO_{3-z}$ (wherein 1.0>x>0.5, 1.1≧y>1.0, and z is a number which renders the composition of matter charge neutral).

EXAMPLE 1

A ceramic-to-metal seal was developed for a ceramic material, $La_{0.9}Ca_{0.1}FeO_{3-z}$, where the metallic clamping element was Haynes 230 and the compensating metallic spacer element was Incoloy 800H. The seal utilized a configuration similar to that of FIG. 2, except that a compliant gasket was used at interface 223 and a compressive compliant ring was installed at interface 217 in a circular groove in first clamp segment or ring 203. The thermal expansion behavior on a unit length basis as a function of temperature for the three materials is given in Table 1.

TABLE 1

Thermal Expansion Behavior of Component Materials

| Temperature, °C. | Thermal Expansion (Thermal strain expressed as Δlength/length in parts per million) | | |
|---|---|---|---|
| | Clamping element (Haynes 230) | Compensating element (Incoloy 800H) | Ceramic element ($La_{0.9}Ca_{0.1}FeO_{3-z}$) |
| 0 | 0 | 0 | 0 |
| 100 | 982.5 | 1152 | 671 |
| 200 | 2327.5 | 2862 | 1638 |
| 300 | 3740 | 4536 | 2720 |
| 400 | 5287.5 | 6270 | 3891 |
| 500 | 6935 | 8064 | 5031 |
| 600 | 8740 | 9918 | 6151 |
| 700 | 10665 | 11900 | 7298 |

Using these expansion characteristics, the reference dimensions $A_R$, $B_R$, and $C_R$ were selected so that the temperature-compensated dimensions satisfied equation (4) given above. The results are given in Table 2.

TABLE 2

Dimensions for Matched Length of Components (See FIG. 2)

| Temperature, °C. | A Length of clamping element, in. | B Length of ceramic element, in. | C Length of compensating element, in. | A − (B + C) Net differential displacement, in. |
|---|---|---|---|---|
| Ambient | 1.035 | 0.45 | 0.585 | 0 |
| 100 | 1.03598584 | 0.450302 | 0.58567392 | 9.97 × 10⁻⁶ |
| 200 | 1.03735463 | 0.450737 | 0.58667427 | −5.7 × 10⁻⁵ |
| 300 | 1.03878551 | 0.451224 | 0.58765356 | −9.2 × 10⁻⁵ |
| 400 | 1.04031731 | 0.451751 | 0.58866795 | −1.0 × 10⁻⁴ |
| 500 | 1.04188275 | 0.452264 | 0.58971744 | −9.9 × 10⁻⁵ |
| 600 | 1.0435698 | 0.452768 | 0.59080203 | −1.8 × 10⁻⁷ |
| 700 | 1.04533965 | 0.453284 | 0.5919615 | 9.4 × 10⁻⁵ |

In Table 2, the values of A, B, and C at ambient temperature are the reference dimensions $A_R$, $B_R$, and $C_R$, respectively. The values of A, B, and C at above-ambient temperature are the temperature-compensated dimensions $A_T$, $B_T$, and $C_T$, respectively.

As can be seen, the net differential displacement as defined by equation (4) never exceeds one ten thousandth of an inch, which is well within the dimensional compensating ability of commercial compliant elements such as metallic C-rings or O-rings.

EXAMPLE 2

A ceramic-to-metal seal was developed for for a ceramic material, $La_{0.4}Sr_{0.6}CoO_{3-z}$, where the metallic clamping element was Inconel 600 and the compensating metallic spacer element was Haynes 230. The configuration of the seal assembly was identical to that of Example 1. The thermal expansion behavior on a unit length basis as a function of temperature for the three materials is given in Table 3.

TABLE 3

Thermal Expansion Behavior of Component Materials

| | Thermal Expansion (thermal strain expressed as $\Delta$length/length in parts per million) | | |
|---|---|---|---|
| Temperature, °C. | Clamping element (Inconel 600) | Compensating element (Haynes 230) | Ceramic element ($La_{0.4}Sr_{0.6}CoO_{3-z}$) |
| 0 | 0 | 0 | 0 |
| 100 | 1064 | 982.5 | 1195 |
| 200 | 2484 | 2327.5 | 2818 |
| 300 | 3976 | 3740 | 4577 |
| 400 | 5510 | 5287.5 | 6453 |
| 500 | 7152 | 6935 | 8673 |
| 600 | 8874 | 8740 | 11351 |
| 700 | 10744 | 10665 | 14325 |

Using these expansion characteristics, the reference dimensions $A_R$, $B_R$, and $C_R$ were selected so that the temperature-compensated dimensions satisfied equation (4) given above. The results are given in Table 4.

TABLE 4

Dimensions for Matched Length of Components (See FIG. 2)

| Temperature, °C. | A Length of clamping element, in. | B Length of ceramic element, in. | C Length of compensating element, in. | A − (B + C) Net differential displacement, in. |
|---|---|---|---|---|
| Ambient | 0.585 | 0.4 | 0.185 | 0 |
| 100 | 0.58562244 | 0.400490531 | 0.185176213 | −0.000044 |
| 200 | 0.58645314 | 0.401153411 | 0.185420875 | −0.000121 |
| 300 | 0.58732596 | 0.401816291 | 0.185676638 | −0.000167 |
| 400 | 0.58822335 | 0.402472501 | 0.185950438 | −0.000200 |
| 500 | 0.58918392 | 0.403129174 | 0.18623025 | −0.000176 |
| 600 | 0.59019129 | 0.403784558 | 0.18653180 | −0.000125 |
| 700 | 0.59128524 | 0.404439112 | 0.18684815 | −0.000002 |

In Table 4, the values of A, B, and C at ambient temperature are the reference dimensions $A_R$, $B_R$, and $C_R$, respectively. The values of A, B, and C at above-ambient temperature are the temperature-compensated dimensions $A_T$, $B_T$, and $C_T$, respectively.

As can be seen, the net differential displacement as defined by equation (4) never exceeds two ten thousandths of an inch, which is well within the dimensional compensating ability of commercial compliant elements such as metallic C-rings or O-rings.

The invention claimed is:

1. A seal assembly comprising:
    (a) a first seal element having a first face, a second face generally parallel to the first face, and an axis orthogonal to the first and second faces, wherein the first seal element is made of a first material having a first coefficient of thermal expansion;
    (b) a second seal element having a first face, a second face generally parallel to the first face, and an axis orthogonal to the first and second faces that is parallel with or coincident with the axis of the first seal element, wherein the second seal element is made of a second material having a second coefficient of thermal expansion, and wherein the first face of the second seal element is in forcible contact with the second face of the first seal element, the second material is selected from the group consisting of aluminum oxide, zirconium oxide, cerium oxide, magnesium oxide, silicon carbide, silicon nitride, mixed metal perovskites, $(La_xSr_{1-x})_yCoO_{3-z}$ (wherein $1.0 > x > 0.4$, $1.02 \geq y > 1.0$, and z is a number which renders the composition of matter charge neutral), and $(La_xCa_{1-x})_yFeO_{3-z}$ (wherein $1.0 > x > 0.5$, $1.1 \geq y > 1.0$, and z is a number which renders the composition of matter charge neutral); and
    (c) a clamping element adapted to urge the first seal element axially toward the second seal element, wherein the clamping element has a first segment in forcible contact with the first face of the first seal element, a second segment in forcible contact with the second face of the second seal element, and a connecting segment between and attached to the first and second segments, wherein the connecting segment has a central portion extending between planes formed by the first face of the first seal element and the second face of the second seal element, is generally parallel to the axes of the first and second seal elements, and is made of a third material having a third coefficient of thermal expansion;
wherein the third coefficient of thermal expansion is intermediate the first and second coefficients of thermal expansion.

2. The seal assembly of claim 1 wherein the first material is selected from the group consisting of Haynes 230, Haynes 188, Haynes 214, Incoloy 800H, Inconel 600, Inconel 625, Inconel 693, and 400-Series Stainless Steels.

3. A seal assembly comprising:
    (a) a first seal element having a first face, a second face generally parallel to the first face, and an axis orthogonal to the first and second faces, wherein the first seal element is made of a first material having a first coefficient of thermal expansion;
    (b) a second seal element having a first face, a second face generally parallel to the first face, and an axis orthogonal to the first and second faces that is parallel with or coincident with the axis of the first seal element, wherein the second seal element is made of a second material having a second coefficient of thermal expansion. and wherein the first face of the second seal element is in forcible contact with the second face of the first seal element;
    (c) a clamping element adapted to urge the first seal element axially toward the second seal element, wherein the clamping element has a first segment in forcible contact with the first face of the first seal element, a second segment in forcible contact with the second face of the second seal element, and a connecting segment between and attached to the first and second segments, wherein the connecting segment has a central portion extending between planes formed by the first face of the first seal element and the second face of the second seal element, is generally parallel to the axes of the first and second seal elements, and is made of a third material having a third coefficient of thermal expansion;

(d) the the second seal element is a flange attached to a first cylindrical pipe having an outer diameter, wherein the flange has an outer diameter;

(e) the clamping element comprises a torroidal body having a first ring that forms the first segment of the clamping element and has an inner and an outer diameter, a second ring that forms the connecting segment of the clamping element and has an inner and an outer diameter, and a third ring that forms the second segment of the clamping element and has an inner and an outer diameter;

(f) the first seal element is a compensating spacer ring having an inner and an outer diameter;

(g) the inner diameter of the first ring that forms the first segment of the clamping element is greater than the outer diameter of the first cylindrical pipe;

(h) the inner diameter of the compensating spacer ring is greater than the outer diameter of the first cylindrical pine and the outer diameter of the compensating spacer ring is less than the inner diameter of the second ring that forms the connecting segment of the clamping element; and (i) the outer diameter of the flange is less than the inner diameter of the second ring that forms the connecting segment of the clamping element;

wherein the third coefficient of thermal expansion is intermediate the first and second coefficients of thermal expansion, the flange and first cylindrical pipe are made of ceramic material, the clamping element is a metallic material, and the compensating spacer ring is a metallic material.

4. The seal assembly of claim 3 wherein the first material is selected from the group consisting of Haynes 230, Haynes 188, Haynes 214, Incoloy 800H, Inconel 600, Inconel 625, Inconel 693, and 400-Series Stainless Steels.

5. The seal assembly of claim 3 wherein the second material is selected from the group consisting of aluminum oxide, zirconium oxide, cerium oxide, magnesium oxide, silicon carbide, silicon nitride, mixed metal perovskites, $(La_xSr_{1-x})_yCoO_{3-z}$ (wherein $1.0 > x > 0.4$, $1.02 \geq y > 1.0$, and z is a number which renders the composition of matter charge neutral), and $(La_xCa_{1-x})_yFeO_{3-z}$ (wherein $1.0 > x > 0.5$, $1.1 \geq y > 1.0$, and z is a number which renders the composition of mailer charge neutral).

6. The seal assembly of claim 3 wherein the third material is selected from the group consisting of Haynes 230, Haynes 188, Haynes 214, Incoloy 800H, Inconel 600, Inconel 625, Inconel 693, and 400-Series Stainless Steels.

7. A seal assembly comprising (a) a first seal element having a first face, a second face generally parallel to the first face, and an axis orthogonal to the first and second faces, wherein the first seal element has a first reference dimension defined by the axial distance between the first and second faces at a reference temperature, and wherein the first seal element is made of a first material having a first coefficient of thermal expansion;

(b) a second seal element having a first face, a second face generally parallel to the first face, and an axis orthogonal to the first and second faces that is parallel with or coincident with the axis of the first seal element, wherein the second seal element has a second reference dimension defined by the axial distance between the first and second faces at the reference temperature, wherein the second seal element is made of a second material having a second coefficient of thermal expansion, and wherein the first face of the second seal element is in contact with the second face of the first seal element; and (c) a clamping element adapted to urge the first seal element axially toward the second seal element, wherein the clamping element has a first segment in forcible contact with the first face of the first seal element, a second segment in forcible contact with the second face of the second seal element, and a connecting segment between and attached to the first and second segments, wherein the connecting segment has a central portion extending between planes formed by the first face of the first seal element and the second face of the second seal element and is generally parallel to the axes of the first and second seal elements, and wherein the central portion is made of a third material having a third coefficient of thermal expansion;

wherein the first material, the reference thickness of the first seal element, the second material, the reference thickness of the second seal element, and the third material have values such that, at any selected temperature, $$|A_T - (B_T + C_T)| \leq 0.002 \text{ inch}$$

where $$A_T = A_R(\alpha_A)(T - T_R),$$

$$B_T = B_R(\alpha_B)(T - T_R), \text{ and}$$

$$C_T = C_R(\alpha_c)(T - T_R),$$

and where T is the selected temperature, $T_R$ is the reference temperature, $A_R$ is the first reference dimension, $B_R$ is the second reference dimension, $A_R$ is the sum of $B_R$ and $C_R$, $\alpha_A$ is the coefficient of thermal expansion of the a first material, $\alpha_B$ is the coefficient of thermal expansion of the second material, and $\alpha_C$ is the coefficient of thermal expansion of the third material.

8. A ceramic-to-metal seal assembly comprising (a) a torroidal compensating spacer ring having a first face, a second face generally parallel to the first face, an inner diameter, an outer diameter, and an axis orthogonal to the first and second faces, wherein torroidal compensating spacer ring is made of a first metal having a first coefficient of thermal expansion;

(b) a cylindrical ceramic tube having an inner diameter, an outer diameter, and a ceramic flange formed at an end of the cylindrical ceramic tube, the ceramic flange having an outer diameter, wherein (1) the inner diameter of the torroidal compensating spacer ring is greater than the outer diameter of the cylindrical ceramic tube and is disposed around the ceramic tube, (2) the ceramic flange forms a second seal element having a first face, a second face generally parallel to the first face, and an axis orthogonal to the first and second faces that is parallel with or coincident with the axis of the torroidal compensating spacer ring, (3) the first face of the second seal element is in forcible contact with the second face of the torroidal compensating spacer ring, and (4) the ceramic flange is made of a ceramic material having a second coefficient of thermal expansion; and (c) a torriodal clamping element adapted to urge the torroidal compensating spacer ring axially toward the second seal element, wherein the clamping element has a first segment in forcible contact with the first face of the torroidal compensating spacer ring, a second segment in forcible contact with the second face of the second seal element, and a connecting segment between and attached to the first and second segments, wherein the connecting segment (1) has a central portion extending between planes formed by the first face of the torroidal compensating spacer ring and the second face of the second seal element, (2) is generally parallel to the axes of the torroidal compensating spacer ring and the second seal element, and (3) is made of a second metal having a third coefficient of thermal expansion;

wherein the third coefficient of thermal expansion is intermediate the first and second coefficients of thermal expansion.

9. The ceramic-to-metal seal assembly of claim 8 wherein the first metal is selected from the group consisting of Haynes 230, Haynes 188, Haynes 214, Incoloy 800H, Inconel 600, Inconel 625, Inconel 693, and 400-Series Stainless Steels.

10. The ceramic-to-metal seal assembly of claim 8 wherein the second metal is selected from the group consisting of Haynes 230, Haynes 188, Haynes 214, Incoloy 800H, Inconel 600, Inconel 625, Inconel 693, and 400-Series Stainless Steels.

11. The ceramic-to-metal seal assembly of claim 8 wherein the ceramic flange is made of a material selected from the group consisting of aluminum oxide, zirconium oxide, cerium oxide, magnesium oxide, silicon carbide, silicon nitride, mixed metal perovskites, $(La_xSr_{1-x})_yCoO_{3-z}$ (wherein $1.0>x>0.4$, $1.02 \geqq y>1.0$, and z is a number which renders the composition of matter charge neutral), and $(La_xCa_{1-x})_yFeO_{3-z}$ (wherein $1.0>x>0.5$, $1.1 \geqq y>1.0$, and z is a number which renders the composition of matter charge neutral).

12. The ceramic-to-metal seal assembly of claim 8 wherein the ceramic tube is made of the same material as the ceramic flange, and wherein the ceramic tube and the ceramic flange form an integrated flanged ceramic tube.

\* \* \* \* \*

UNITED STATES PATENT AND TRADEMARK OFFICE
CERTIFICATE OF CORRECTION

PATENT NO. : 7,581,765 B2
APPLICATION NO. : 11/281663
DATED : September 1, 2009
INVENTOR(S) : Eric Minford Page 1 of 1

It is certified that error appears in the above-identified patent and that said Letters Patent is hereby corrected as shown below:

Column 21, Line 42

In claim 5 delete "mailer" and insert --matter--

Signed and Sealed this

Twenty-seventh Day of October, 2009

David J. Kappos
*Director of the United States Patent and Trademark Office*